United States Patent [19]
Addison

[11] Patent Number: 5,990,950
[45] Date of Patent: Nov. 23, 1999

[54] METHOD AND SYSTEM FOR COLOR FILTER ARRAY MULTIFACTOR INTERPOLATION

[75] Inventor: Stephen B. Addison, Atlanta, Ga.

[73] Assignee: Iterated Systems, Inc., Atlanta, Ga.

[21] Appl. No.: 09/022,211

[22] Filed: Feb. 11, 1998

[51] Int. Cl.[6] ............................ H04N 3/14; H04N 5/335; H04N 9/04; H04N 9/83

[52] U.S. Cl. ............................................................ 348/273

[58] Field of Search .................................... 348/245, 246, 348/247, 257, 441, 615, 616, 617, 266, 272, 273, 280; 382/300

[56] References Cited

U.S. PATENT DOCUMENTS

| | | | |
|---|---|---|---|
| 4,125,856 | 11/1978 | Netravaili et al. ....................... | 358/13 |
| 4,605,956 | 8/1986 | Cok . | |
| 4,630,307 | 12/1986 | Cok . | |
| 4,642,678 | 2/1987 | Cok ........................................... | 358/44 |
| 4,716,455 | 12/1987 | Ozawa et al. . | |
| 5,382,976 | 1/1995 | Hibbard . | |
| 5,596,367 | 1/1997 | Hamilton, Jr. et al. ................ | 348/272 |
| 5,652,621 | 7/1997 | Adams, Jr. et al. .................... | 348/272 |
| 5,742,348 | 4/1998 | Kuwahara et al. ...................... | 348/441 |
| 5,764,804 | 6/1998 | Yajuma et al. .......................... | 382/238 |

*Primary Examiner*—Wendy Garber
*Assistant Examiner*—Alicia M. Harrington
*Attorney, Agent, or Firm*—Morris, Manning & Martin

[57] ABSTRACT

Missing intensity values for color values for a color component array derived from a color filter array are predicted using the system and method of the present invention. The method uses predictor sets for each missing intensity value to select a best value for each missing intensity value. The predictor sets include a luminance predictor set, a first chrominance predictor set and a second chrominance predictor set. The member predictors of the luminance predictor set are selected in response to a comparison between a variance between neighboring luminance values and a predetermined threshold. The first chrominance set is used to predict chrominance values of a color type at locations where a chrominance value of another color type was originally stored. The second chrominance set is used to predict chrominance values of a color type at locations where a luminance value was originally stored. Preferably, the member elements of the predictor sets are ranked and the median values selected as the missing intensity value.

16 Claims, 5 Drawing Sheets

$R_{12}, G'_{12}$          $R_9, G'_9$
       $G'_0, B_0$
$R_{11}, G'_{11}$          $R_{10}, G'_{10}$ $G'_1, R_1, B'_1$
$G'_4, R'_4, B_4$    $G_0$    $G'_2, R'_2, B_2$
$G'_3, R_3, B'_3$

METHOD AND SYSTEM FOR COLOR FILTER ARRAY MULTIFACTOR INTERPOLATION

FIELD OF THE INVENTION

The invention relates generally to color pixel value interpolation methods, and more specifically, to predicting luminance and chrominance pixel values for partially populated pixel arrays obtained by a digital camera.

BACKGROUND OF THE INVENTION

In many high-end digital cameras, a light beam is partitioned by a beam splitter into three component single color beams. Each component beam strikes a light sensor array such as a charge-coupled device (light sensor array) or Complementary Metal Oxide Semi-conductor (CMOS) sensor. These light sensors are typically comprised of hundreds of thousands of photo sensitive sensor elements. Each sensor element senses the intensity of the colored light striking it. The greater the intensity of the incoming light, the greater the resulting charge on that sensor element. These individual charges are converted into electrical signals which are further converted and encoded into digital data. The digital data is combined such that each pixel location of the resulting image includes a red, green and blue value.

Lower-end digital cameras use a single light sensor-array in conjunction with a color filter array (CFA). The image light passes through conventional optics and is directed onto a CFA, which can be a coating on the light sensor array or separate from the light sensor array. The CFA comprises an array of discrete color filter elements, each corresponding to a sensor element of the light sensor array. Each discrete color filter element filters all light except one color. Each filter element for a typical CFA normally allows one of three colors through. The most common CFA systems are red-green-blue ("RGB") and magenta-green-cyan-yellow ("Mg-G-Cy-Y"). Thus, a light sensor array sensor element aligned to receive light filtered by a red color filter element of the CFA, generates an intensity signal proportional to the red light in the polychromatic light incident on the filter element. Traditionally, a CFA includes more luminance filter elements (e.g., green in an RGB system) than chrominance filter elements (e.g. red or blue in an RGB system). Luminance is sampled at a greater frequency as the human eye is more sensitive to luminance than chrominance information.

The data collected by a single light sensor array system is sparsely sampled because each sensor element only senses one color wavelength and not all three. The data collected by a single light sensor array system can be thought of as three partially populated component color arrays, each array including all information received for a single color by the light sensor array. To generate a complete color image, a value for each location in each color component array is required.

Known interpolation methods (e.g., bilinear or cubic spline) exist that may be used to complete component color arrays for a color image. An improvement over the bilinear method is disclosed in U.S. Pat. No. 5,382,976 to Hibbard (the "'976 Patent"). That patent is directed to the interpolation of array elements for a high frequency color component array. As is well known, the green color components of an RGB color component system, which are sometimes referred to as the luminance components, are thought to be the color component to which the human eye is most sensitive. This sensitivity means that the human eye discerns most of the detail in an image from the green color component or luminance of an image. So that a light sensor array captures detail to which the human eye responds, most CFAs include at least twice as many green or luminance color filter elements as other color filter elements.

The interpolation technique of the '976 Patent generates green or luminance intensity values for those array elements in the green component array which did not receive a green intensity value. The technique of that patent uses gradients to select the existing luminance values in the vicinity of array elements for which a value is to be interpolated. The selected luminance values are then used to generate a luminance value for the missing array element. The completed luminance array and the existing chrominance values in the other color component arrays are used to interpolate array element intensity values for the color components other than green.

While the technique disclosed in U.S. Pat. No. 5,382,976 improves the image quality over those derived using the bilinear interpolation method alone, artifacts still result in images generated from this method. In particular, color artifacts arise when use of a gradient results in an interpolated value for a green array element which is lower than it should be to accurately represent the image and the corresponding red or blue component improperly dominates the composite color image. This may be particularly noticeable at edges where an array element should be included in a horizontal or vertical edge but the bilinear interpolations for the elements of the chroma color component array includes intensities in both the horizontal and vertical directions.

Other variations of the bilinear method are used to predict missing pixel intensity values. For example, U.S. Pat. No. 4,630,307 to Cok (the "'678 Patent") discloses a method of interpolation in which a median of four neighboring values is used if the value is located at an edge. Otherwise, the missing array element is interpolated using a median of those values and a clip function. The values used for the clip function depend upon the particular pattern to which the missing pixel location belongs. While this method improves pixel interpolation for some array elements, especially those located at some edges, the resulting images are still subject to color artifacts.

What is needed is a method and apparatus for predicting values to complete partially populated single color arrays without generating numerous color artifacts.

SUMMARY OF THE INVENTION

The above limitations of prior interpolation methods are overcome by a method and system performed in accordance with the principles of the present invention. The method of the present invention includes the steps of predicting missing luminance values in a partially populated array of luminance and chrominance values from predictors of a luminance predictor set for each array location missing a luminance value, at least one of the predictors in the luminance predictor set having a value derived from chrominance values in the array; predicting missing chrominance values of a first color type in the array from predictors of a first chrominance predictor set for each array location at which a chrominance value of a second color type was originally stored, some of the predictors of the first chrominance predictor set having a value derived from previously predicted luminance values; predicting missing chrominance values of a second color type in the array from predictors of the first chrominance predictor set for each array location at which a chrominance value of the first color type was originally stored, some of the predictors of the first chrominance predictor set having a value derived from previously predicted luminance values; predicting missing chrominance values of the first color type in the array from predictors of a second chrominance predictor set for each array location at which a luminance value was originally stored; and predicting missing chrominance values of the second color type in the array from predictors of the second chrominance predictor set for each array location at which a luminance value was originally stored.

The missing intensity values first predicted by the method of the present invention are luminance values, at an array location where a chrominance value is stored. The array includes first, second, third and fourth luminance values adjacent to the chrominance value location at first, second, third and fourth locations, respectively, along first, second, third and fourth directions, respectively; first, second, third and fourth chrominance values at fifth, sixth, seventh and eighth locations, respectively; the fifth, sixth, seventh and eighth locations adjacent the first, second, third and fourth locations along the first, second, third and fourth directions, respectively; and a fifth luminance value at the fifth location and a sixth luminance location at the sixth location. The luminance predictor set is preferably comprised of member predictors selected from a set of ten member predictors. The selection of member predictors is based on a comparison of a variance of the luminance values surrounding an origin to a threshold. If the variance is less than the threshold a first set of member predictors for luminance is selected and if the variance is equal to or greater than the threshold, a second set of member predictors for luminance is selected. The threshold is an empirically determined value. The predictors of the selected luminance predictor set are preferably ranked and a best value of the ranked predictors is selected as the best value for the luminance value at the origin. Preferably, the best value is the median value of the ranked predictors.

The process of the present invention uses a first chrominance predictor set to predict missing intensity values for chrominance component values for first and second color types at locations where the second and first chrominance color type, respectively, was originally stored. The array locations included in the determination of the missing chrominance values are first, second, third and fourth interpolated luminance values diagonal and adjacent to the origin at first, second, third and fourth locations, respectively; to the previously interpolated luminance value, and first, second, third and fourth chrominance values at the first, second, third and fourth locations, respectively. The predictors of the first chrominance predictor set are: (1) the first chrominance component value plus the difference of the luminance value and the first luminance value, (2) the second chrominance component value plus the difference of the luminance value and the second luminance value, (3) the third chrominance component value plus the difference of the luminance value and the third luminance value, and (4) the fourth chrominance component value plus the difference of the luminance value and the fourth luminance value. The four predictors are ranked and a best value is selected as the missing chrominance intensity value. Preferably, the best value is the median of the ranked member predictors.

The process of the present invention also uses a second chrominance predictor set to predict chrominance values at locations where luminance values are stored in the original partially filled array. In a preferred embodiment, all three processes are implemented to first complete the array of luminance values, predict chrominance values of a first color component at locations where chrominance values of a second color component are stored, and vice versa, and then predict chrominance values of both color components where luminance values are stored.

A system which implements the method of the present invention includes an input buffer for the storage of the partially filled array and a data processor performing under the control of a computer program. The data processor identifies each element of the array for which there is no intensity value and performs the above-described method for interpolating the intensity value for that identified array element.

DETAILED DESCRIPTION OF THE INVENTION

Figure 2:
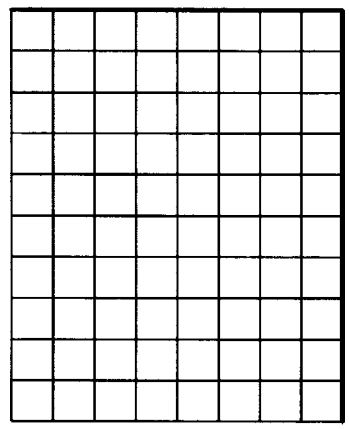
FIG. 2 is a depiction of an array containing intensity values for three color components generated by a color filter array shown in FIG. 1.
Figure 1:
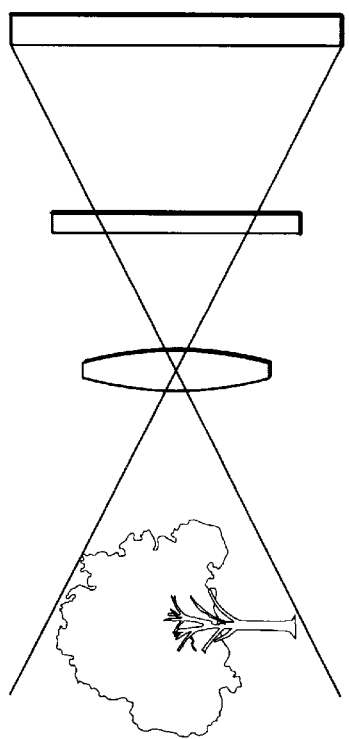
FIG. 1 is a diagram of a system that generates color intensity values for an image corresponding to an object.

A system 10 that generates partially complete color arrays is shown in FIG. 1. The system includes a lens 12, a CFA 16, and a light sensor array 18. These components are typically used in camcorders and lower-end digital cameras. Light from an object 20 is processed by the system 10 to generate intensity values that are used to partially populate color component arrays. CFA 16 may be an RGB checkerboard array of discrete color filter elements. FIG. 2 shows an array containing intensity values generated by the sensor elements of light sensor array 18 after light passes through CFA 16. The filter elements of CFA 18 may be distributed according to the Bayer pattern which is commonly used for CFAs. In this pattern, the green ("luminance") intensity values are twice as frequent as the red or blue ("chrominance") elements. Luminance values are typically sampled more frequently than chrominance values as the human eye is more sensitive to luminance information.

Figure 3:
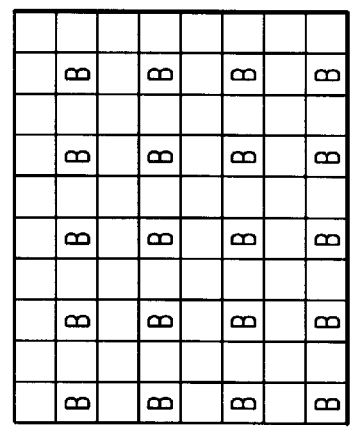
FIG. 3 shows three partially complete component color arrays corresponding to the intensity values in the array shown in FIG. 2.
Figure 3:
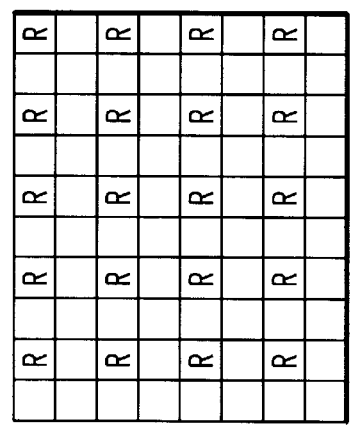
Figure 3:
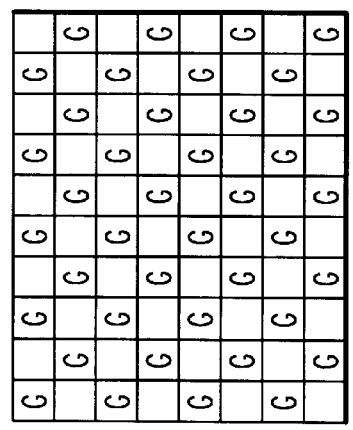

The intensity values of the array in FIG. 2 may be used to generate a partially populated luminance component array, G, and partially populated first and second chrominance component arrays, R and B, as shown in FIG. 3. Typically, known interpolation methods have been employed to complete each partially populated component array. Most significantly, these methods have interpolated luminance component values by only using other luminance values.

The interpolation method of the current invention instead uses chrominance component values of a first or second color type as well as luminance component values to interpolate luminance component values. After the luminance array is completed, the inventive method uses luminance component values from the completed array and chrominance component values of a first color type in the partially filled arrays to generate a first chrominance predictor set for predicting missing chrominance component values for a first color type at locations where chrominance component values of the second color type were originally stored. The completed luminance component and chrominance component array of the second color type may be used in the first chrominance predictor set to generate missing values for the chrominance array of the second color type at locations where chrominance values of the first color type were originally stored. A second set of chrominance predictors are then determined using values from the luminance array and the chrominance array of the first color type to predict missing values for the chrominance array of the first color type at locations where luminance values were originally stored. The second set of chrominance predictors are then determined using values from the luminance array and the chrominance array of the second color type to predict missing values for the chrominance array of the second color type at locations where luminance values were originally stored. Preferably, the intensity value for a location is the median of a set of predictors calculated from those intensity values surrounding a location of interest ("origin").

Prior to performing the method of the present invention, initial values need to be determined for array locations located around the edge of the partially populated array. These initial values may be obtained in a number of ways. When the array has an odd number of rows and/or an odd number of columns, one way of setting initial conditions is to make the luminance and chrominance components equal. For example, in the bottommost odd numbered row or leftmost odd numbered column, the values actually stored in each array position are used to initialize a value for the missing chrominance or luminance components. For example, if the luminance component is stored at an array location in the odd row or column, the red and blue chrominance components are set to the same intensity value as the luminance value. Likewise, where a red or blue chrominance component is stored, the other chrominance color type and luminance value are initialized to the value of the stored chrominance value. Alternatively, an additional column or row may be added to the partially populated array to make it an array having an even number of columns and rows. This array may then be processed as discussed below. Alternatively, missing values in the odd numbered row or column may be predicted by linear interpolation using the nearest neighbors in a known manner. Another way of making an array having an even number of rows or columns is to replicate the next to last row or column in the array as the outermost row or column. This even numbered row and column array may then be processed as discussed below.

When the partially populated array has an even number of rows and columns, the method of the present invention is initialized by first interpolating a two pixel boundary around the image. This may be performed by beginning at the upper leftmost corner of the array and taking the first two elements of the first two rows to form a two-by-two matrix. For each two-by-two matrix in a Bayer pattern array, the matrices have the form:

$R \quad G_1$ $G_2 \quad B$

These values, generated by light sensor 18, are used to provide the missing luminance and chrominance values for each 2×2 matrix as follows:

$R, (G_1 + G_2)/2, B \quad R, G_1, B$ $R, G_2, B \quad\quad R, (G_1 + G_2)/2, B$ Thus, the missing luminance values are the mean of the luminance values provided by the light sensor and the missing chrominance values are set to a value equal to the chrominance values generated by the light sensor.

Interpolation of Luminance Component Values

To predict a luminance value, a luminance predictor set, preferably comprised of ten member predictors, is calculated from the values surrounding a location where a chrominance intensity value is stored. These values surrounding an origin are shown in FIGS. 4 and 5.

Figures 4, 5, 6:
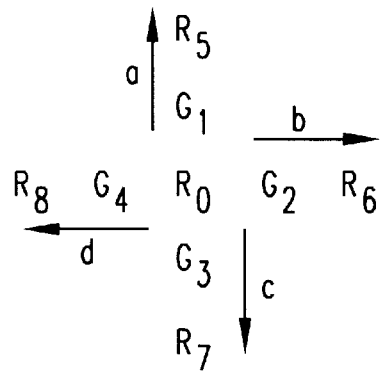
FIG. 4 is a diagram of intensity values sensed for two color components by a portion of the light sensor array in FIG. 1 that are used to generate luminance values not sensed by the light sensor array.
FIG. 5 is a diagram of sensed and interpolated values that are used to generate a first type of chrominance value at locations where a second type of chrominance value was sensed.
FIG. 6 is a diagram of sensed and interpolated values that are used to generate chrominance values at locations where a luminance value was sensed.

FIG. 4 shows intensity values for neighboring luminance and chrominance components that were generated by a portion of light sensor 18. FIG. 5 shows intensity values generated by a portion of light sensor 18 as well as interpolated or predicted values. Each value is designated by its color (i.e., R for red, G for green, or B for blue) and its location (i.e., numerical subscript or "O" for origin). Interpolated values are designated by a prime ('). FIGS. 4 and 5 do not show intensity values for all locations in an array to simplify the figures.

The first four member predictors are luminance only component values:

$G_1$ \hfill (1)

$G_2$ \hfill (2)

$G_3$ \hfill (3)

$G_4$ \hfill (4)

where these values are adjacent the origin along directions a, b, c, or d, from the origin, respectively. For example, the first predictor is the luminance value adjacent the origin in the "a" direction, or $G_1$.

The second four member predictors are luminance/chrominance predictors which means the predictors are calculated from neighboring luminance values and chrominance values. One member predictor is preferably calculated as $G_1$ plus the first chrominance component value at the origin, $R_0$, minus the first chrominance component value adjacent $G_1$ along direction a, $R_5$. The other predictors are similarly calculated resulting in the following predictors:

$G_1+R_0-R_5;$ \hfill (5)

$G_2+R_0-R_6;$ \hfill (6)

$G_3+R_0-R_7;$ \hfill (7)

$G_4+R_0-R_8.$ \hfill (8)

The two other member predictors of the luminance set may be expressed as:

$$G'_5 + R_0 - R_5; \quad (9)$$

$$G'_8 + R_0 - R_8. \quad (10)$$

In these predictors, $G'_5$ and $G'_8$ are previously interpolated luminance component values at the same location as $R_5$ and $R_8$ shown in FIG. 4. These values are obtained by identical processing on image data previous to this location (such as from pixel processing in raster-order) or by processing edge values, as discussed above, to establish missing values that can be used to determine member values for sets used in the method of the present invention. To determine which member predictors are used to predict a luminance value, a "variance" measure is first computed from the four surrounding and adjacent luminance values as follows:

$$\text{variance} = \text{abs}(G1 - G2 + G3 - G4);$$

where abs( ) takes the absolute value of the total quantity inside the parenthesis.

If this variance is below a predetermined level or threshold, then a set of predictors is selected. The preferred set of predictors is comprised of the predictors (1)–(8) presented above. If the variance is equal to or above the threshold, the last six predictors (5)–(10) are selected. The threshold for the variance can be set to an appropriate level, determined by the range of the pixel values. A value that works well with 8-bit image sensors is 90. Values for the predictors of the selected set are ranked by value, with the median value preferably being selected as the predicted luminance component value for the origin.

In a similar manner the luminance value for an origin where a second color component is located may be computed. For example, where the origin contains a blue color component value $B_0$, the ten predictor members are:

$$G_1;$$

$$G_2;$$

$$G_3;$$

$$G_4;$$

$$G_1 + B_0 - B_5;$$

$$G_2 + B_0 - B_6;$$

$$G_3 + B_0 - B_7;$$

$$G_4 + B_0 - B_8;$$

$$G'_5 + B_0 - B_5;$$

$$G'_8 + B_0 - B_8.$$

These preferred predictors and a variance calculation are used to select the member predictors for a set, as described above, for the origins in the red and blue arrays so the partially filled luminance array may be completed.

Interpolation of a First Type Chrominance Value at a Location where a Second Type Chrominance Value was Generated The method of the present invention also contemplates the calculation of missing chrominance values for a first color type component array at each location where a chrominance value for a second color type component array is stored. In the method of the present invention, the order of computing the types of chrominance values is unimportant.

FIG. 5 shows chrominance values of a first color type component that were generated by a portion of light sensor 18 and interpolated luminance values from the steps of the method discussed above. The missing chrominance component value $R_0$ of FIG. 5 is selected by preferably using a first chrominance set of member predictors that are the chrominance component value at a location adjacent and diagonal to the origin minus the difference of the interpolated luminance component value at that same diagonal location and the interpolated luminance component value at the origin. Accordingly, the preferred four member predictors of the first chrominance set from FIG. 5 are:

$$G'_0 + (R_9 - G'_9);$$

$$G'_0 + (R_{10} - G'_{10});$$

$$G'_0 + (R_{11} - G'_{11});$$

$$G'_0 + (R_{12} - G'_{12}).$$

Each interpolated luminance component value must be known before the predictors of the first chrominance set can be evaluated. Each interpolated luminance component value may be obtained using the previously discussed method to interpolate luminance component values. The values for the member predictors are ranked and the median is selected as the predicted value for the missing chrominance value. Preferably, the median value is clamped to the end points of the range for the intensity values. In a similar manner values for this first chrominance set of four member predictors are computed using blue chrominance values to predict missing blue chrominance values at locations where red chrominance values are stored.

Interpolation of Chrominance Values at Locations Containing a Luminance Value

The method of the present invention contemplates interpolation of missing first and second color type chrominance component values at the locations where light sensor 18 generated a luminance value. Again, the order of interpolating first and second chrominance component values is unimportant. FIG. 6 shows an origin surrounded by locations for which all these color components have been determined.

The members of the preferred second chrominance set are calculated as the chrominance component value or interpolated chrominance component value at a first location adjacent the origin minus the difference of the interpolated luminance component value at that location adjacent the origin and the luminance component value at the origin. Accordingly, the four preferred predictors for predicting chrominance component value $R_0$ in FIG. 6 are:

$$G_0 + (R_1 - G'_1);$$

$$G_0 + (R_2 - G'_2);$$

$$G_0 + (R_3 - G'_3);$$

$$G_0 + (R_4 - G'_4).$$

Once the member values are known, the member predictors are ranked and the median value is selected as the chrominance component value $R_0$.

Again, each interpolated value must be known before the members of the second chrominance set can be evaluated. Each interpolated value can be obtained using either the previously discussed method to interpolate missing luminance component values, the previously discussed method to interpolate a missing chrominance value where light sensor 18 returns a chrominance value, or other known interpolation methods. However, it is preferred to use the method of the present invention.

Similarly, the second chrominance predictor set for the blue chrominance component value $B_O$ in FIG. 6 may be expressed as:

$G_0+(B_1-G'_1)$;

$G_0+(B_2-G'_2)$;

$G_0+(B_3-G'_3)$;

$G_0+(B_4-G'_4)$.

The values for these four member predictors are ranked and the median value is selected as the blue chrominance component value, $B_O$, at the origin.

Alternative Variations of the Inventive Method

An alternative method for interpolating missing luminance and chrominance values for a partially populated color component array that is within the principles of the present invention includes the steps of generating missing luminance values by using a variance that is compared to a threshold to select a set of member predictors, such as the method discussed above, and then generating the remaining red and blue chrominance values from the first and second chrominance sets discussed above. The difference between the alternative method and the preferred method discussed above is that the values for the four member predictors of the first and second chrominance sets are averaged rather than ranked for selection of the predicted value.

Another method for interpolating missing luminance and chrominance values for a partially populated color component array that is within the principles of the present invention includes the steps of generating missing luminance values using a luminance set such as the one discussed above and generating the remaining red and blue chrominance values from two single chrominance sets, each set being comprised of two predictors. For generation of missing chrominance components of a first color type at a location where a chrominance component of a second color type is stored, the two predictors are two of the four member predictors of the first chrominance set discussed above with reference to FIG. 5, namely:

$G_0+(R_{10}-G'_{10})$;

$G_0+(R_{12}-G'_{12})$.

The values for these two member predictors are averaged and the mean value is selected as the value for the chrominance component of the first color type at the origin. For generation of chrominance values at an origin where a luminance value is stored, the single chrominance set is comprised of two member predictors from the four member predictors of the second chrominance set discussed above with reference to FIG. 6, namely:

$G_0+(R_2-G'_2)$;

$G_0+(R_4-G'_4)$.

Again, the intensity values for the two member predictors are averaged and this mean value is used as the chrominance component at the origin.

System Implementing the Method of the Present Invention

Figure 7:
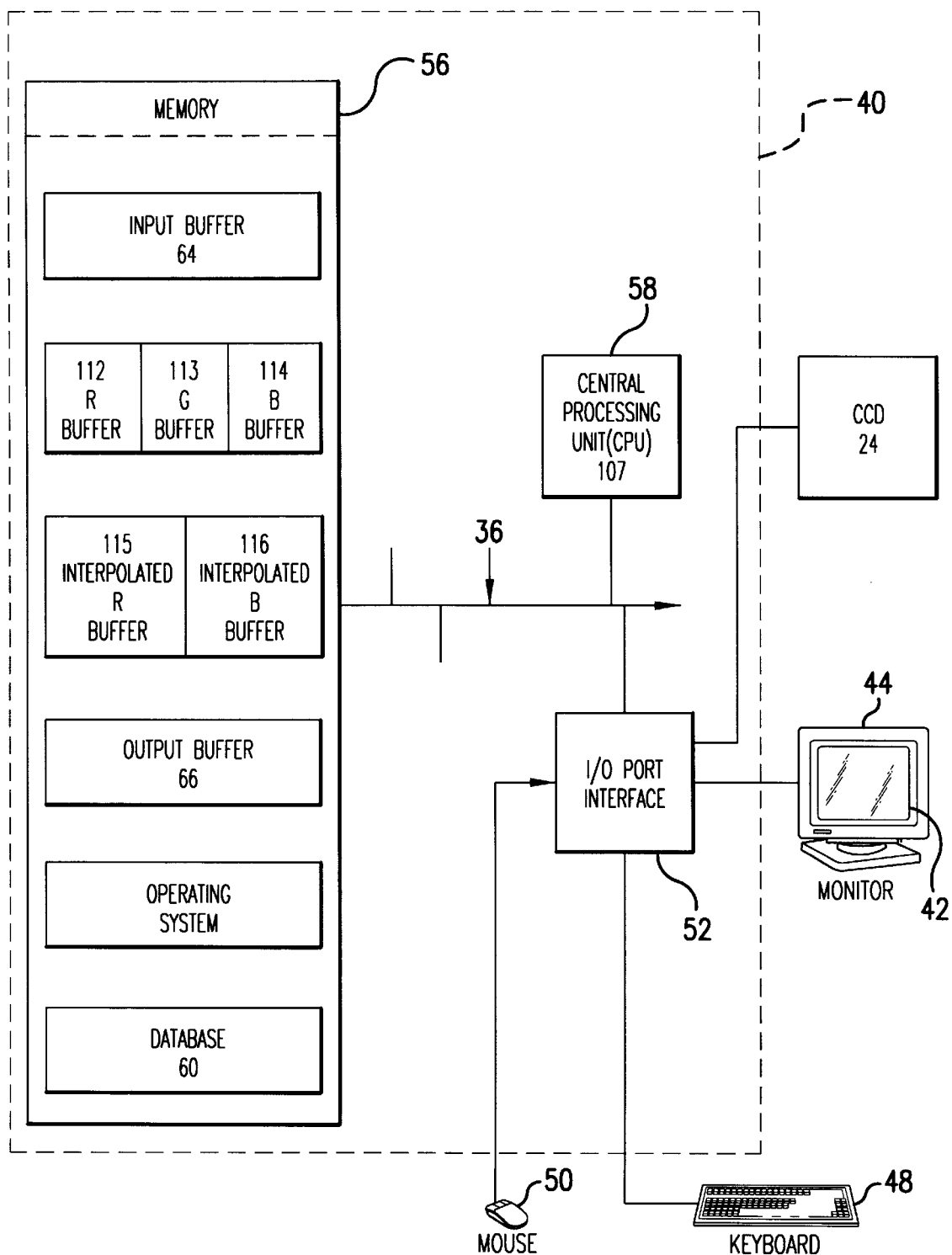
FIG. 7 is a block diagram of a system that implements the method of the present invention.

The methods of the present invention set forth above may be performed in a computer system 40 as shown in FIG. 7. For simplicity of the drawings, many components of a standard computer system are not illustrated, such as address buffers, memory buffers and other control circuits because these elements are well known and illustrated in the know art and are not necessary for an understanding of the present invention. Computer system 40 includes a graphical user interface 42 that may display an image on a display monitor 44. Graphical user interface 42 is implemented as part of computer system 40 to receive input signals from a conventional keyboard 48 or from a mouse or other input device 50 via an input/output interface 52. Light sensor 18 provides object image data that is stored in input/output interface 52.

The computer programs used to implement the various steps or processes of the present invention are generally located in the memory unit 56 with the processes of the present invention carried out using a central processing unit (CPU) 58. Those skilled in the art will appreciate memory unit 56 is representative of read-only and random access memory. The memory unit also contains a database 60 that stores data and tables that may be used in conjunction with the present invention. A computer system suitable for use with the present invention may contain 16 MB of RAM, a 500 MB hard drive and a general purpose microprocessor such as the Pentium 90 MHz microprocessor manufactured by Intel Corporation of Santa Clara, Calif.

An exemplary method of the present invention that may be implemented by computer system 40 is described below with reference to FIG. 8. Computer system 40 receives chrominance and luminance values from light sensor 18 and stores them in input buffer 64 (Step 100). Central processing unit 58 retrieves this information and divides input buffer 64 into a partially populated green, red and blue arrays (Step 102). Each array is then processed to provide values in the edge locations so the inventive process is initialized (Step 104). Working first with the green array, the process computes the variance for an origin and compares it to a threshold (Step 106). The corresponding set of predictor members is selected and the values of the predictor members calculated (Steps 108, 110). The process then ranks the members of the luminance set and selects the median value as the missing green value (Step 112). Next, the process determines if the green array is now completely populated (Step 114) and the process continues until the green array is filled. Once the green array is complete, the completed green array is stored in output buffer 66 (Step 116).

The process continues by predicting values for the partially populated red and blue arrays. Selecting one of the chrominance arrays, the red array, for example, the process continues by calculating a first chrominance set preferably having four member predictors for a missing red value location (Step 118). These predictors are ranked and the median selected as the missing red value for that location (Step 120). The process continues until all red values corresponding to locations where blue chrominance values are stored are predicted (Step 122). The process then switches to the blue array and interpolates blue values for those locations where red chrominance values are stored. The member predictors of the first chrominance set are calculated (Step 124), and then ranked by value so the median value may be selected as the blue chrominance value (Step 128). The process continues until all blue values corresponding to locations where red chrominance values are stored are predicted (Step 130).

The process then continues by predicting red and blue chrominance values for each location where an original green luminance value is stored. After selecting one of the chrominance values, red, for example, the process calculates values for the member predictors of a second chrominance set for a red value origin (Step 132). Preferably, there are four predictors and the predictor values are ranked so the median value may be selected as the missing red value (Step 134). The process continues until the red array is complete (Step 140) and then processes the other chrominance array.

Figure 8A:
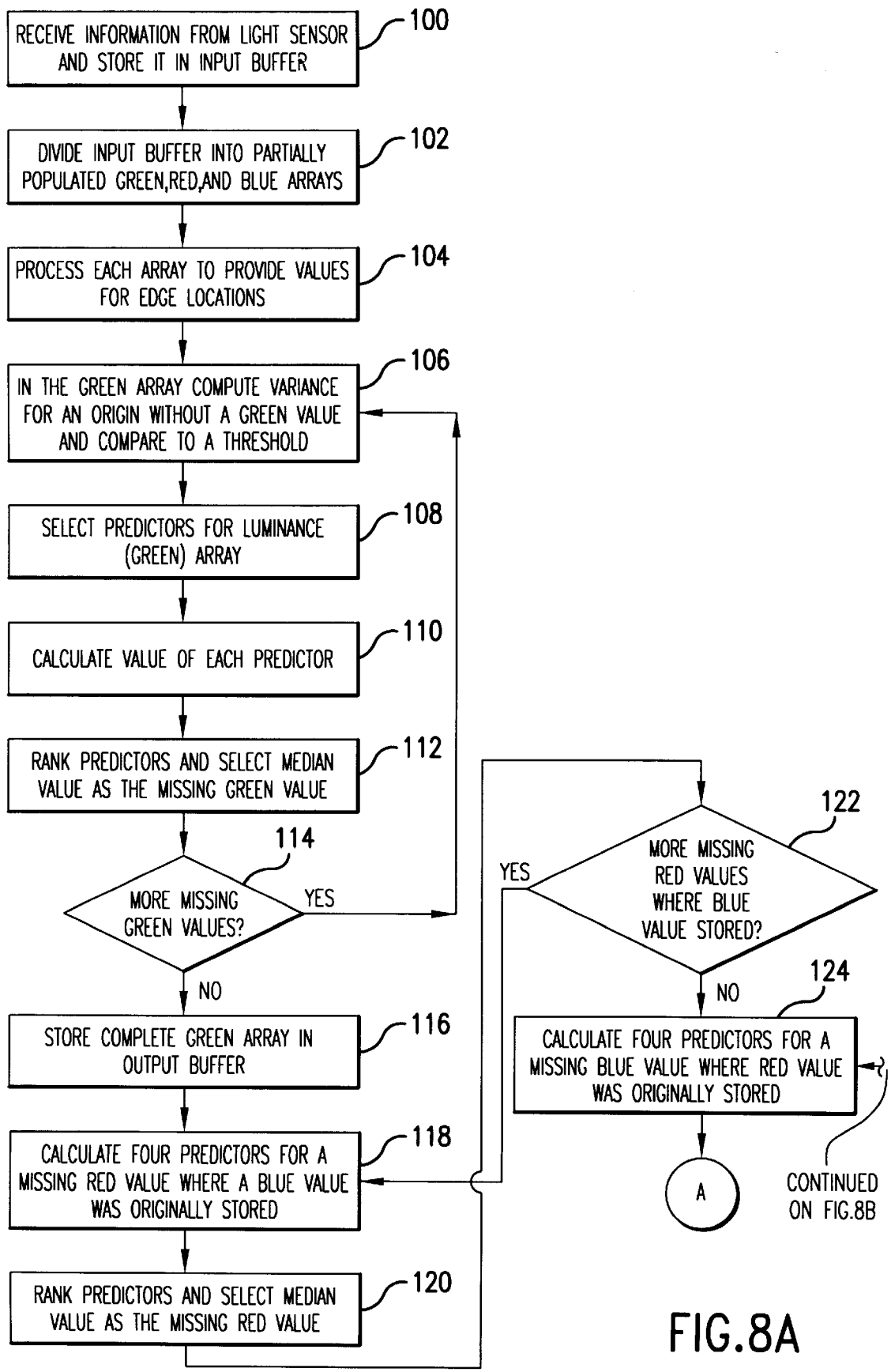
FIG. 8 is a flow chart showing the steps of an exemplary method performed by the system of FIG. 7.
Figure 8B:
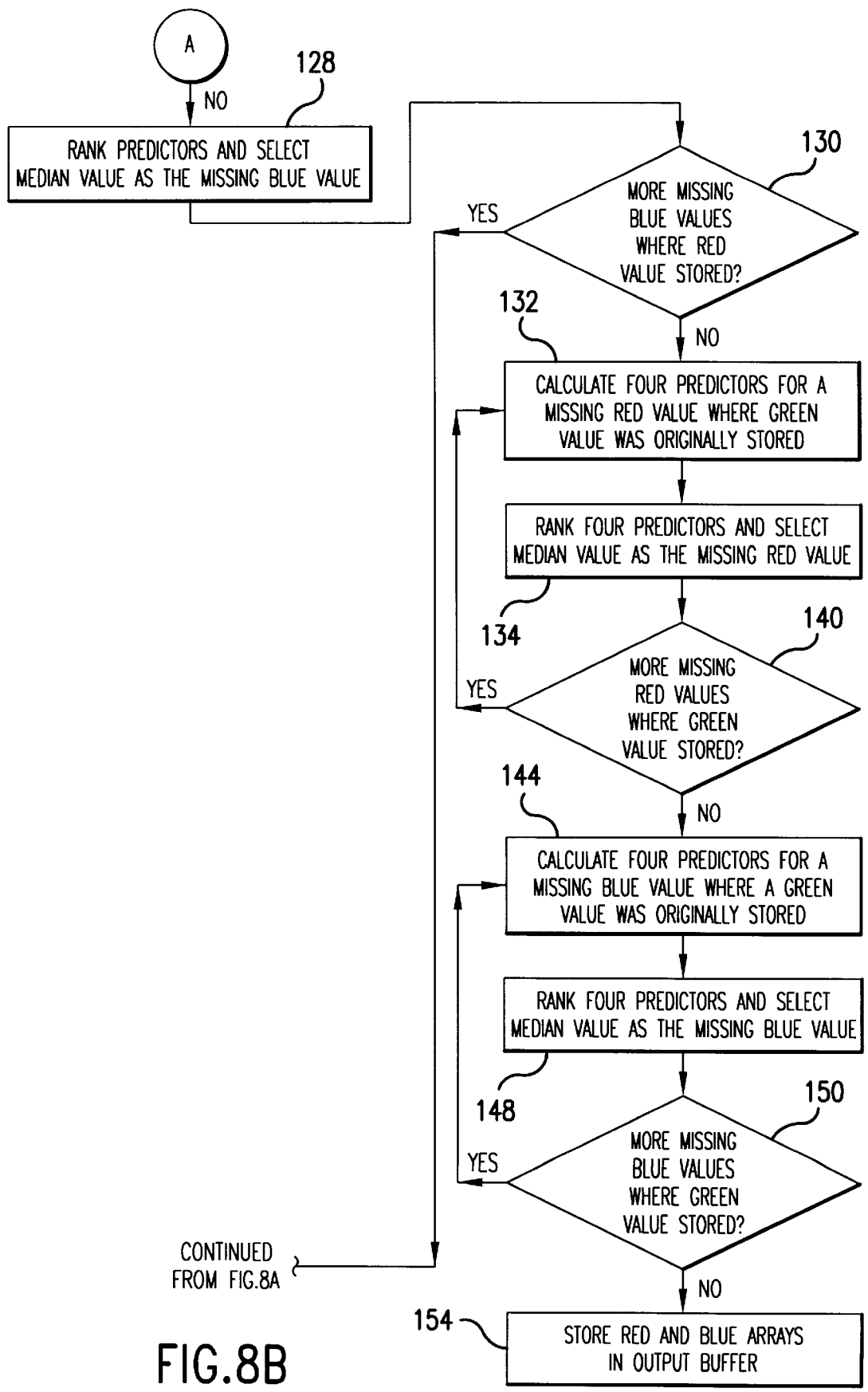

In the exemplary process of FIG. 8, the values of the 5 member predictors of the second chrominance set are calculated for the locations where an original green luminance value is stored (Step 144). These predictors are ranked and the median value is selected as the missing blue value (Step 148). This process continues until the blue array is complete (Step 150). The completed red and blue component arrays are then stored in output buffer 66 (Step 154).

While the present invention has been illustrated by a description of preferred and alternative embodiments and processes, and while the preferred and alternative embodiments and processes have been described in considerable detail, it is not the intention of the Applicant(s) to restrict or in any way limit the scope of the appended claims to such detail. For example, the principles of the invention can be applied to light sensor array systems using CFA patterns other than the Bayer pattern. Other modifications and equivalents include implementation of the inventive method on a embedded processor, such as a digital signal processor (DSP) or reduced instruction set computer (RISC), a custom integrated circuit or other digital circuit implementation, an analog circuit or a combination of these components and their equivalents. Additional advantages and modifications will readily appear to those skilled in the art.

What is claimed is:

1. A method for predicting missing color component values in a partially populated array of luminance and chrominance values, the method comprising the steps of:

predicting missing luminance values in a partially populated array of luminance and chrominance values from predictors of a luminance predictor set for each array location missing a luminance value, at least one of said predictors in said luminance predictor set having a value derived from chrominance values in said array;

predicting missing chrominance values of a first color type in said array from predictors of a first chrominance predictor set for each array location at which a chrominance value of a second color type was originally stored, some of said predictors of said first chrominance predictor set having a value derived from previously predicted luminance values;

predicting missing chrominance values of a second color type in said array from predictors of a first chrominance predictor set for each array location at which a chrominance value of a first color type was originally stored, some of said predictors of said first chrominance predictor set having a value derived from previously predicted luminance values;

predicting missing chrominance values of said first color type in said array by ranking predictors of a second chrominance predictor set for each array location at which a luminance value was originally stored; and predicting missing chrominance values of said second color type in said array by ranking predictors of a second chrominance predictor set for each array location at which a luminance value was originally stored.

2. The method of claim 1, said predicting missing luminance values step further comprising the steps of:

computing a variance from a plurality of neighboring luminance values;

comparing said computed variance to a predictor threshold;

selecting said predictors of said luminance predictor set to include luminance only and luminance/chrominance predictors in response to said variance being below said threshold; and selecting said predictors of said luminance predictor set to include only luminance/chrominance predictors in response to said variance being equal to or greater than said predictor threshold.

3. The method of claim 1 further comprising the steps of:

ranking said predictors for each luminance predictor set;

selecting the median of said ranked predictors for each luminance predictor set as the predicted luminance value for each array location at which a luminance value was not originally stored;

ranking said predictors for each first chrominance predictor set;

selecting the median of said ranked predictors for each first chrominance predictor set as the predicted chrominance value for each array location where a chrominance value was originally stored;

ranking said predictors for each second chrominance set; and selecting the median of said ranked predictors for each second chrominance predictor set as the chrominance value for each array location where a luminance value was originally stored.

4. The method of claim 2 wherein said predictors selected for said luminance predictor set in response to said variance being below said threshold are:

$G_1$, $G_2$, $G_3$, $G_4$, $G_1+C_0-C_5$, $G_2+C_0-C_6$, $G_3+C_0-C_7$, and $G_4+C_0-C_8$ where $C_0$ is the chrominance value for the chrominance color type stored at the array location for which the luminance value is being predicted and $C_5$, $C_6$, $C_7$, and $C_8$ are neighboring values for the chrominance color type of $C_0$ and where $G_1$, $G_2$, $G_3$, $G_4$ are luminance values.

5. The method of claim 4 wherein said predictors of said luminance predictor set selected in response to said variance being equal to or greater than said threshold are:

$G_1+C_0-C_5$;

$G_2+C_0-C_6$;

$G_3+C_0-C_7$;

$G_4+C_0-C_8$;

$G'_5+C_0-C_5$;

$G'_8+C_0-C_8$;

where $G'_5$ and $G'_8$ are previously predicted luminance values neighboring the array location for which the luminance value is being predicted.

6. The method of claim 5 wherein said predictors for said first chrominance predictor set are:

$G'_0+(C_9-G'_9)$;

$G'_0+(C_{10}-G'_{10})$;

$G'_0+(C_{11}-G'_{11})$;

$G'_0+(C_{12}-G'_{12})$;

where $G'_0$ is a previously predicted luminance values at the array location for which the luminance value is being predicted and $G'_9$, $G'_{10}$, $G'_{11}$, and $G'_{12}$ are previously predicted luminance values neighboring the array location for which the luminance value is being predicted and $C_9$, $C_{10}$, $C_{11}$, and $C_{12}$ are chrominance values neighboring the array location for which the luminance value is being predicted that are of the same color type as the color type being predicted.

7. The method of claim 6 wherein said predictors for said second chrominance predictor set are:

$G_0+(C_1-G'_1)$;

$G_0+(C_2-G'_2)$;

$G_0+(C_3-G'_3)$;

$G_0+(C_4-G'_4)$;

where $G_0$ is the luminance value originally stored at the array location for which the chrominance value is being predicted, $G'_1$, $G'_2$, $G'_3$, and $G'_4$ are previously predicted luminance values neighboring the array location for which the chrominance value is being predicted and $C_1$, $C_2$, $C_3$, and $C_4$ are chrominance values neighboring the array location for which the chrominance value is being predicted of the same color type as the chrominance value being predicted.

8. The method of claim 1 further comprising the step of:
computing a mean of said predictors of said first and said second chrominance predictor sets as the predicted chrominance values.

9. A system for predicting missing color component values in a partially populated array of luminance and chrominance values comprising:
means for predicting missing luminance values in a partially populated array of luminance and chrominance values from predictors of a luminance predictor set for each array location missing a luminance value, at least one of said predictors in said luminance predictor set having a value derived from chrominance values in said array;
means for predicting missing chrominance values of a first color type in said array from predictors of a first chrominance predictor set for each array location at which a chrominance value of a second color type was originally stored, some of said predictors of said first chrominance predictor set having a value derived from previously predicted luminance values;
means for predicting missing chrominance values of a second color type in said array from predictors of a first chrominance predictor set for each array location at which a chrominance value of a first color type was originally stored, some of said predictors of said first chrominance predictor set having a value derived from previously predicted luminance values;
means for predicting missing chrominance values of said first color type in said array by ranking predictors of a second chrominance predictor set for each array location at which a luminance value was originally stored; and
means for predicting missing chrominance values of said second color type in said array by ranking predictors of a second chrominance predictor set for each array location at which a luminance value was originally stored.

10. The system of claim 9, further comprising:
means for computing a variance from a plurality of neighboring luminance values;
means for comparing said computed variance to a predetermined threshold;
means for selecting said predictors of said luminance predictor set to include luminance only and luminance/chrominance predictors in response to said variance being below said threshold; and
means for selecting said predictors of said luminance predictor set to include only luminance/chrominance predictors in response to said variance being equal to or greater than said predictor threshold.

11. The system of claim 9 further comprising:
means for ranking said predictors for each luminance predictor set;
means for selecting the median of said ranked predictors for each luminance predictor set as the predicted luminance value for each array location at which a luminance value was not originally stored;
means for ranking said predictors for each first chrominance predictor set;
mean for selecting the median of said ranked predictors for each first chrominance predictor set as the predicted chrominance value for each array location where a chrominance value was originally stored;
means for ranking said predictors for each second chrominance set; and
means for selecting the median of said ranked predictors for each second chrominance predictor set as the chrominance value for each array location where a luminance value was originally stored.

12. The system of claim 10 wherein said means for selecting said predictors for said luminance predictor set in response to said variance being below said threshold selects:

$G_1$, $G_2$, $G_3$, $G_4$, $G_1+C_0-C_5$, $G_2+C_0-C_6$, $G_3+C_0-C_7$, and $G_4+C_0-C_8$ where $C_0$ is the chrominance value for the chrominance color type stored at the array location for which the luminance value is being predicted and $C_5$, $C_6$, $C_7$, and $C_8$ are neighboring values for the chrominance color type of $C_0$ and where $G_1$, $G_2$ $G_3$ and $G_4$ are luminance values.

13. The system of claim 12 wherein said means for selecting said predictors of said luminance predictor set selected in response to said variance being equal to or greater than said threshold selects:

$G_1+C_0-C_5$;

$G_2+C_0-C_6$;

$G_3+C_0-C_7$;

$G_4+C_0-C_8$;

$G'_5+C_0-C_5$;

$G'_8+C_0-C_8$;

where $G'_5$ and $G'_8$ are previously predicted luminance values neighboring the array location for which the luminance value is being predicted.

14. The system of claim 13 wherein said means for selecting said predictors for said first chrominance predictor set selects:

$G'_0+(C_9-G'_9)$;

$G'_0+(C_{10}-G'_{10})$;

$G'_0+(C_{11}-G'_{11})$;

$G'_0+(C_{12}-G'_{12})$;

where $G'_0$ is a previously predicted luminance values at the array location for which the luminance value is being predicted and $G'_9$, $G'_{10}$, $G'_{11}$, and $G'_{12}$ are previously predicted luminance values neighboring the array location for which the luminance value is being predicted and $C_9$, $C_{10}$, $C_{11}$, and $C_{12}$ are chrominance values neighboring the array location for which the luminance value is being predicted that are of the same color type as the color type being predicted.

15. The system of claim 14 wherein said means for selecting said predictors for said second chrominance predictor set selects:

$G_0+(C_1-G'_1)$;

$G_0+(C_2-G'_2)$;

$G_0+(C_3-G'_3)$;

$G_0+(C_4-G'_4)$;

where $G_0$ is the luminance value originally stored at the array location for which the chrominance value is being predicted, $G'_1$, $G'_2$, $G'_3$, and $G'_4$ are previously predicted luminance values neighboring the array location for which the chrominance value is being predicted and $C_1$, $C_2$, $C_3$, and $C_4$ are chrominance values neighboring the array location for which the chrominance value is being predicted of the same color type as the chrominance value being predicted.

16. The method of claim 9 further comprises:

means for computing a mean of said predictors of said first and said second chrominance predictor sets as the predicted chrominance values.

* * * * *